(12) United States Patent
Tootill et al.

(10) Patent No.: US 8,904,498 B2
(45) Date of Patent: Dec. 2, 2014

(54) BIOMETRIC IDENTIFICATION FOR MOBILE APPLICATIONS

(71) Applicant: CA, Inc., Islandia, NY (US)

(72) Inventors: David Tootill, Mercer Island, WA (US); Marcel den Hartog, IJsselstein (NL)

(73) Assignee: CA, Inc., New York, NY (US)

( * ) Notice: Subject to any disclaimer, the term of this patent is extended or adjusted under 35 U.S.C. 154(b) by 127 days.

(21) Appl. No.: 13/653,977

(22) Filed: Oct. 17, 2012

(65) Prior Publication Data

US 2014/0109200 A1    Apr. 17, 2014

(51) Int. Cl.
*G06F 7/04* (2006.01)
(52) U.S. Cl.
USPC ............... 726/5; 726/9; 380/229; 709/217; 709/218; 709/229; 705/65
(58) Field of Classification Search
CPC ......... G06F 21/30; G06F 21/31; G06F 21/32; H04L 9/32; H04L 63/0407; H04L 9/3231; H04L 63/0861; H04L 9/0866
USPC .............................. 726/5, 9; 380/229; 705/65; 709/217–218, 229
See application file for complete search history.

(56) References Cited

U.S. PATENT DOCUMENTS

| 7,079,007 | B2 | 7/2006 | Siegel |
| 7,596,545 | B1 | 9/2009 | Lee |
| 7,690,032 | B1 * | 3/2010 | Peirce ............................... 726/9 |
| 2004/0068693 | A1 | 4/2004 | Rawat |
| 2010/0125657 | A1 * | 5/2010 | Dowling et al. .............. 709/224 |
| 2011/0072264 | A1 | 3/2011 | McNulty |

* cited by examiner

*Primary Examiner* — Thanhnga B Truong
(74) *Attorney, Agent, or Firm* — Vierra Magen Marcus LLP

(57) ABSTRACT

Methods for automating the entry of password information and other user credentials into native and web-based computing applications are described. In some embodiments, an end user identity and a corresponding authentication level may be determined during an unlock event or during operation of a computing device. The end user identity may be determined by capturing biometric characteristics of an end user of the computing device (e.g., by performing facial recognition and/or voice recognition). Upon the detection of an authentication request from an application running on the computing device, the end user identity and the corresponding authentication level may be used to acquire and provide user credentials for authenticating the end user to the application.

20 Claims, 8 Drawing Sheets

Mobile Device 140

BIOMETRIC IDENTIFICATION FOR MOBILE APPLICATIONS

BACKGROUND

The present disclosure relates to the automated management of user credentials and other identification information for entry into security protected applications.

Credentials may be used to gain access to information and/or computing resources. For example, it is common for an end user of a mobile device (e.g., a tablet computer) to provide user credentials, such as a user identifier and password, in order to gain access to applications (e.g., native applications or web-based applications) running on the mobile device or in the cloud. In some cases, multi-factor authentication may be used in which more than one credential is required in order to gain access to applications running on a mobile device. For example, two-factor authentication may require the end user of the mobile device to provide two authentication factors before gaining access to the applications running on the mobile device. An authentication factor may comprise a knowledge factor (e.g., something the end user has knowledge of such as a password), a possession factor (e.g., something the end user has possession of such as a smart card or security token), or an inherence factor (e.g., something inherent only to the end user such as a biometric characteristic). Biometric characteristics may comprise distinguishing characteristics of the end user such as a fingerprint, a voice characteristic, or a facial characteristic.

BRIEF SUMMARY

According to one aspect of the present disclosure, technology for managing user specific credentials and other identification information is disclosed.

One embodiment comprises a method for automating entry of a user credential into a computing application running on a computing device comprising determining an identity of an end user of the computing device using biometric identification; setting an authentication level of the computing device based on a level of trust of the biometric identification; detecting an authentication request corresponding with the computing application; determining a target application identifier associated with the computing application; acquiring the user credential based on the identity of the end user, the authentication level of the computing device, and the target application identifier; and providing the user credential to the computing application.

One embodiment comprises a system comprising a storage device and a processor in communication with the storage device. The storage device stores a user state. The processor programmed to detect an unlock condition associated with the system, determine an identity of an end user of the system using biometric identification in response to the unlock condition being detected; set the user state based on the identity of the end user; set an authentication level based on a level of trust of the biometric identification; detect an authentication request corresponding with a computing application running on the system; determine a target application identifier associated with the computing application; acquire a user credential based on the user state, the authentication level, and the target application identifier; and provide the user credential to the computing application.

One embodiment comprises a computer program product comprising a computer readable storage medium having computer readable program code embodied therewith. The computer readable program code configured to detect an authentication request corresponding with a target application running on a computing device, configured to determine a target application identifier associated with the target application, configured to determine an identity of an end user of the computing device based on biometric characteristics of the end user, and configured to set an authentication level based on a level of trust of the biometric identification. The computer readable program code configured to acquire a user credential based on the identity of the end user, the authentication level, and the target application identifier. The computer readable program code configured to provide the user credential to the target application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
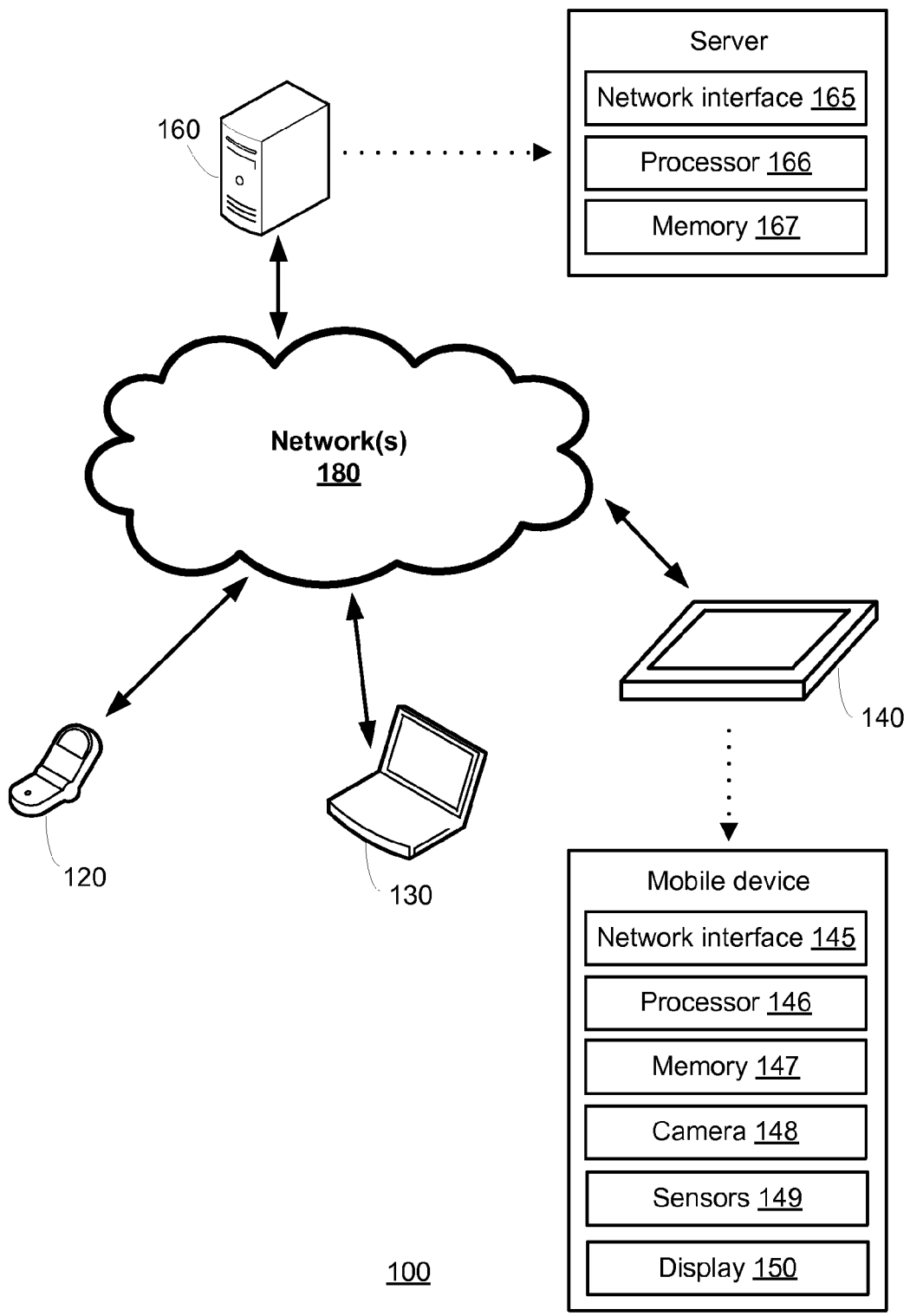
FIG. 1 depicts one embodiment of a networked computing environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for automating the entry of password information and other user credentials into native and web-based computing applications. In some embodiments, an end user identity and a corresponding authentication level may be determined during an unlock event or during operation of a computing device. The end user identity may be determined by capturing biometric characteristics of an end user of the computing device (e.g., by performing facial recognition and/or voice recognition). Upon the detection of an authentication request from an application running (or being executed) on the computing device, the end user identity and the corresponding authentication level may be used to acquire and provide user credentials for authenticating the end user to the application.

Many mobile device applications (e.g., native or web-based applications running on a tablet computer or mobile phone) require an end user to enter password information or other user specific credentials in order to gain access to security protected content or features. To improve data security and prevent unauthorized access to the security protected applications, the end user may have to manage a large number of different user names and/or different passwords for gaining access to the security protected applications (e.g., an online bank account). Having to manage such a large number of different user names and/or different passwords may be tedious and insecure because the large number of passwords may be difficult to remember and short passwords (i.e., weak passwords) are encouraged because password entry is typically made via a small virtual keyboard on a mobile device. Thus, there is a need to automate the entry of password information and other user specific credentials into native and web-based applications running on mobile devices.

FIG. 1 depicts one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 120, mobile device 130, mobile device 140, and server 160. In some embodiments, the plurality of computing devices may include other computing devices not shown. A computing device may comprise various computing devices such as a mobile phone, laptop computer, desktop computer, or tablet computer. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as server 160, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein.

One embodiment of mobile device 140 includes a network interface 145, processor 146, memory 147, camera 148, sensors 149, and display 150, all in communication with each other. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Camera 148 may capture images or video. Sensors 149 may generate motion and/or orientation information associated with mobile device 140. Sensors 149 may comprise an inertial measurement unit (IMU). Display 150 may display digital images and/or videos. Display 150 may comprise a touchscreen display.

In some embodiments, various components of mobile device 140 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 140 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In some embodiments, a mobile device, such as mobile device 140, may be in communication with a server in the cloud, such as server 160, and may provide to the server authentication information (e.g., a password associated with an end user of the mobile device) and/or user identification information (e.g., an alphanumeric user identifier) associated with the end user. In response, the server may transmit to the mobile device security protected data accessible by the end user. In one embodiment, the authentication information may be automatically determined by the mobile device based on biometric characteristics of the end user. In another embodiment, the authentication information may be automatically determined by the mobile device based on the identification of various biometric characteristics of the end user, as well as the detection of various gestures performed by the end user, and other factors such as the location of the mobile device.

In one embodiment, the automatic filling-in of passwords and other user credentials may be transparent to security protected applications running on or accessible by the mobile device. For example, the combination of biometric identification of the end user and automatic password handling may be used to automatically fill-in and submit end user credentials both securely and transparently to security protected applications. The processes on the mobile device for determining an identity of an end user of the mobile device using biometric identification and for automatically generating authentication information based on the identity of the end user may be run at the operating system level.

In one embodiment, processes for determining an identity of an end user based on biometric identification and for automatically generating authentication information based on the identity of the end user may be embodied within a virtual keyboard application. The virtual keyboard application may acquire user credentials associated with the end user from a secure data repository (e.g., a password vault or other secure store of passwords). The secure data repository may include encrypted password data and may be resident on either the same computing device as the virtual keyboard application or in the cloud.

Figure 2A:
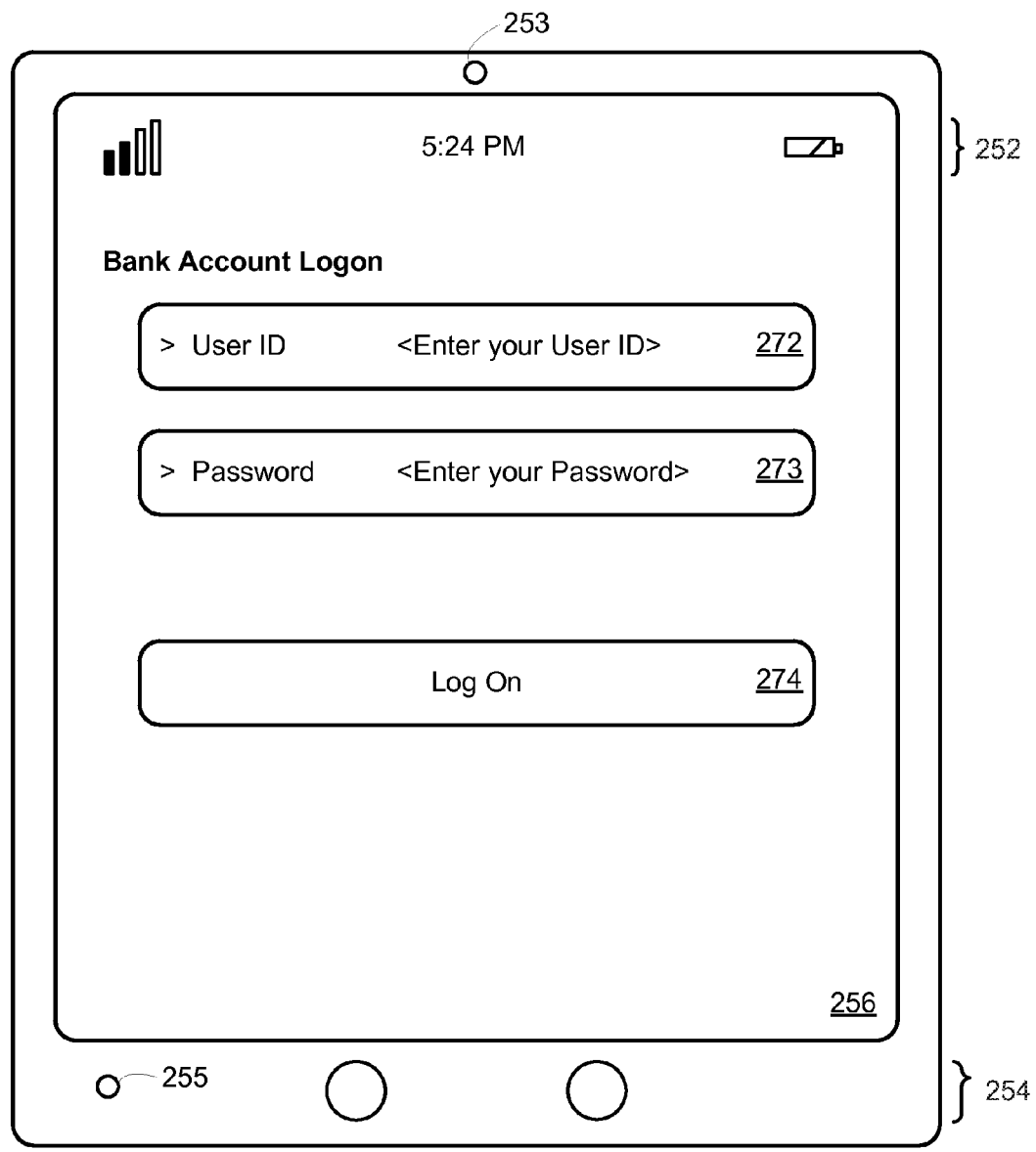
FIG. 2A depicts one embodiment of a mobile device running a security protected application.
Figure 2B:
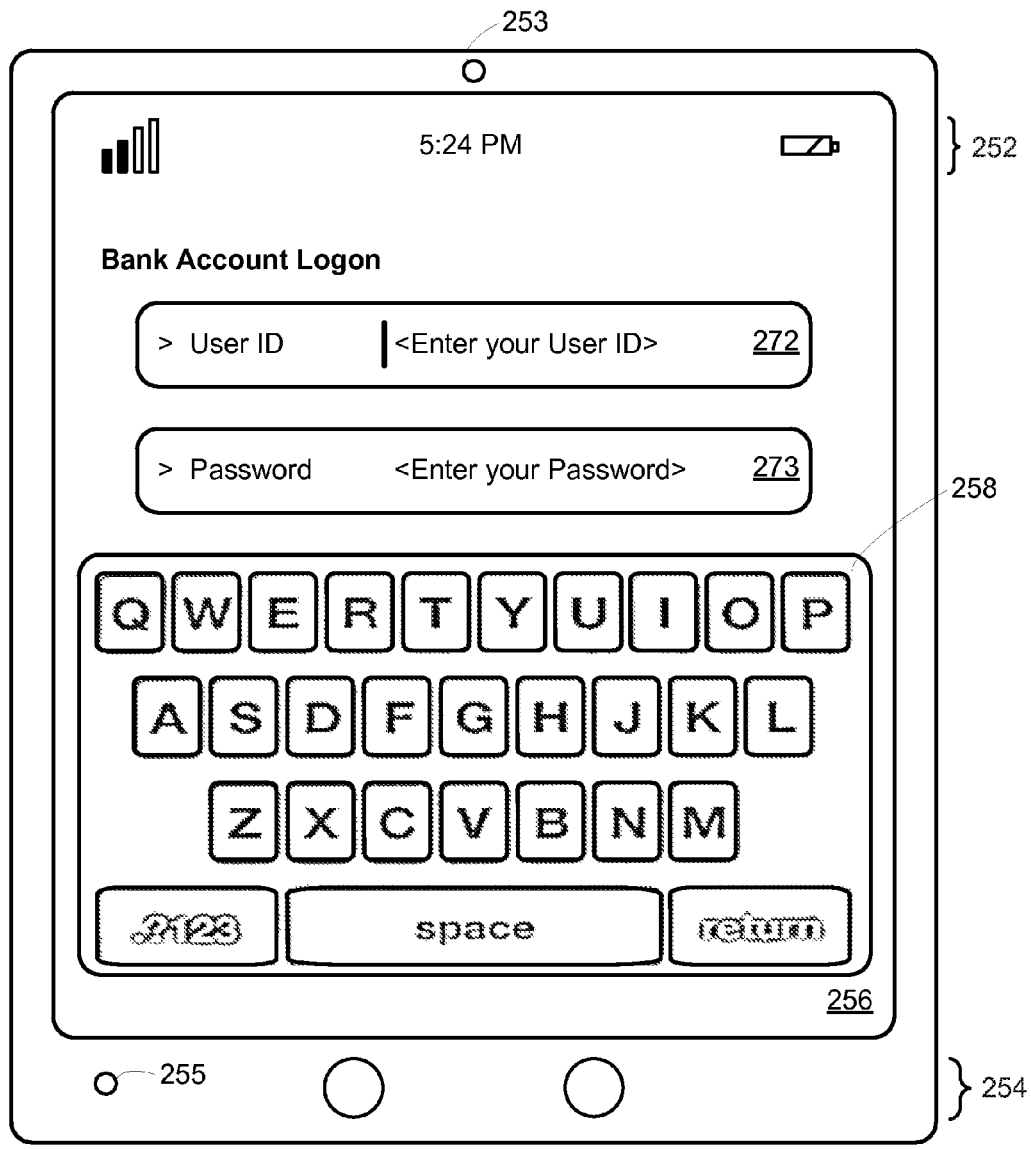
FIG. 2B depicts one embodiment of a mobile device utilizing a virtual keyboard for data entry.

FIG. 2A depicts one embodiment of mobile device 140 of FIG. 1 running a security protected application. As depicted, mobile device 140 includes a touchscreen display 256, physical control buttons 254, a microphone 255, and a front-facing camera 253. The touchscreen display 256 may include an LCD display for presenting a user interface to an end user of the mobile device. The touchscreen display 256 may include a status area 252 which provides information regarding signal strength, time, and battery life associated with the mobile device. Status area 252 may also provide information about an authentication level of the mobile device such as whether a particular biometric identification has been made and/or a level of trust associated with the particular biometric identification. In some embodiments, the determination of the authentication level may be based on a number of different biometric identifiers used for identifying an end user of the mobile device and/or a particular location of the mobile device (e.g., the mobile device may be located at the end user's home, office, or other frequently visited or predefined location associated with the end user). The microphone 255 may capture audio associated with the end user (e.g., the end user's voice) for determining the identity of the end user. The front-facing camera 253 may be used to capture images of the end user for determining the identity of the end user. FIG. 2B depicts one embodiment of mobile device 140 of FIG. 1 running a security protected application and utilizing a virtual keyboard 258 for data entry. The virtual keyboard application 258 may be invoked automatically by the security protected application or by selection by an end user of a particular entry field of the security protected application.

In some embodiments, the mobile device 140 may automatically identify the end user based on biometric characteristics and set a user state of the mobile device based on the identification of the end user. In one example, the end user may be identified based on facial characteristics using facial recognition techniques and/or voice characteristics using voice recognition techniques. Once the end user has been identified, a table lookup of a mapping table associating end user identifications with user identifiers and/or passwords for various security protected applications (e.g., a password vault or other secure store of passwords) may be performed to acquire the corresponding user identifier and/or password. In one embodiment, the corresponding user identifier may be entered into the User ID field 272 and the corresponding password may be entered into the Password field 273 based on the identification of the end user and the particular security protected application. The Log On button 274 allows the end user to submit user credentials to the security protected application (e.g., to log into an online bank account).

In one embodiment, the user identifier and/or the password may be acquired and provided to the security protected application (e.g., by filling in the appropriate fields) only if the end user performs a particular gesture. In one example, the particular gesture may comprise a touch gesture or multi-touch gesture using the touchscreen display 256 (e.g., the end user performing a check mark gesture over a particular field). In another embodiment, the user identifier and/or the password may be provided to the security protected application if the end user triggers the display of a virtual keyboard and then performs a particular gesture over the virtual keyboard (e.g., the end user virtual writing their initials over the virtual keyboard).

In some embodiments, for a given security protected application, an end user (or user state) may be associated with more than one user identifier and/or password. For example, an end user may have multiple online bank account accessible via the same security protected application (e.g., the end user may have a personal bank account and a business related bank account at the same bank that are accessible online via the same webpage). In some cases, the user identifier and/or password selected for entry and provided to the security protected application may comprise the most recently used user identifier and/or password entry. In cases where a user credential conflict exists (i.e., more than one set of user credentials may be applied), the end user may select the specific user identifier and/or password entry by performing a particular gesture. In one example, the particular gesture may comprise a touch gesture or multi-touch gesture using the touchscreen display 256 (e.g., the end user may virtually write a symbol, such as a letter or shape, associated with the specific user identifier and/or password entry).

Figure 3A:
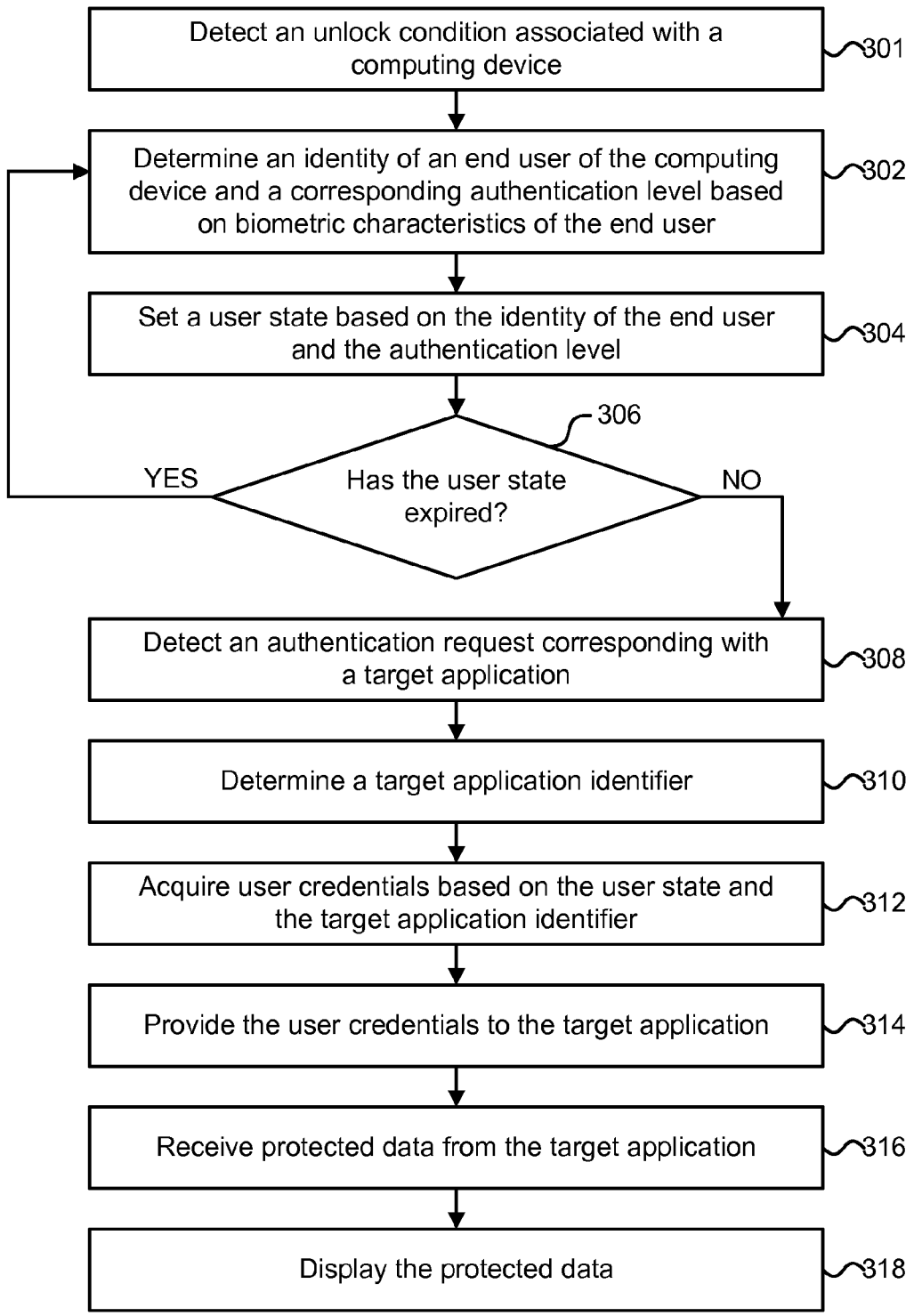
FIG. 3A is a flowchart describing one embodiment of a process for automating the entry of user credentials into a computing application.

FIG. 3A is a flowchart describing one embodiment of a process for automating the entry of user credentials into a computing application. In one embodiment, the process of FIG. 3A is performed by a mobile device, such as mobile device 140 in FIG. 1.

In step 301, an unlock condition associated with a computing device is detected. In some cases, the unlock condition may be detected upon the submission of a particular passcode or password into a passcode lock screen of a computing device. The unlock condition may be associated with a power-up sequence (or an awake from sleep mode sequence) of the computing device and, upon detection, may allow an end user of the computing device to control the operation of the computing device via an unlocked graphical user interface. In one embodiment, the computing device may comprise a mobile computing device.

In step 302, an identity of an end user of the computing device and a corresponding authentication level may be determined based on one or more biometric characteristics of the end user. In some cases, the identity of the end user may be determined in response to detection of the unlock condition. In one embodiment, the identity of the end user of the computing device and a corresponding authentication level may be determined by performing facial recognition techniques and/or voice recognition techniques. In some cases, the biometric characteristics may comprise distinguishing characteristics of the end user including one or more voice characteristics and/or one or more facial characteristics. The biometric characteristics may also comprise fingerprint characteristics (e.g., via a finger scan) or retinal characteristics (e.g., via a retinal scan of an eye of the end user).

The corresponding authentication level may be associated with a degree of confidence of the identity of the end user. In some cases, the corresponding authentication level may be updated over time as additional biometric characteristics of the end user are identified. In one embodiment, a first authentication level corresponding with a likelihood that the identity of the end user is in fact the correct identity may be determined based on a first set of biometric characteristics captured during a first time period. A second authentication level corresponding with a high probability that the identity of the end user is in fact the correct identity may be determined based on a second set of biometric characteristics different from the first set of biometric characteristics during a second time period. In one example, the authentication level may be associated with a high probability that the identity of the end user is in fact the correct identity if both a facial recognition match and a voice recognition match correspond with a particular identity of the end user. In another example, the authentication level may be associated with a high probability that the identity of the end user is in fact the correct identity if the biometric identification was obtained while the mobile device was in a known location, such as the end user's home or office.

One embodiment of a process for determining an identity of an end user is described later in reference to FIG. 3B.

In step 304, a user state based on the identity of the end user and the authentication level is set. The user state may correspond with a current end user of the computing device and be accessible by various applications running on the computing device including applications running at the operating system level. In one embodiment, the user state may be stored as one or more system variables or one or more environment variables.

In step 306, it is determined whether the user state has expired. If it is determined that the user state has expired, then step 302 is performed. Otherwise, if it is determined that the user state has not expired, then step 308 is performed. In one embodiment, the user state may expire after a predetermined period of time (e.g., after 30 minutes have passed since the user state was last set). In another embodiment, the user state may expire after a predetermined level of inactivity of the mobile device (e.g. after 5 minutes since the user last interacted with the touchscreen). In some cases, the user state may expire or be locked out if the presence of a new user different from the end user associated with the user state is detected.

In step 308, an authentication request corresponding with a target application is detected. In one embodiment, the target application may comprise a native application. A native application is one that is designed to be run on a particular computing device or in a particular computing environment. A native application may be an application locally installed on the computing device. In another embodiment, the target application may comprise a web-based application. A web-based application is one that may require some portions of the application (e.g., program instructions) to be downloaded from the Internet each time the application is run. In one example, a web-based application may comprise a web browser-based application that is running within a web browsing application running on the computing device. In another example, a web-based application may comprise a client application that is downloaded from the Internet when the end user of the computing device interacts with an external server.

In some embodiments, an authentication request may be detected upon the triggering of a virtual keyboard by the end user of the computing device or upon a virtual keyboard application requesting user input into an application field known to be a password (for example, one that the virtual keyboard transforms entered text into bullets). In other embodiments, in order for the authentication request to be detected, the end user must both trigger the display of a virtual keyboard on the computing device and perform a particular gesture over the virtual keyboard (e.g., writing their initials over the virtual keyboard). In some cases, the authentication request may be explicitly requested by the target application.

In step 310, a target application identifier is determined. The target application identifier may comprise an alphanumeric identifier associated with the target application. The target application identifier may correspond with an application currently being viewed or used by the end user of the computing device or an application at the top of an application stack. The target application identifier may correspond with a particular website or webpage. In one example, an end user of the computing device may select a password field associated with a particular website within a web browser (e.g., a password field associated with an online banking account). In this case, the target application identifier may correspond with the particular website or the particular webpage that is being interacted with by the end user.

In step 312, user credentials based on the user state and the target application identifier are acquired. The user credentials may include a user password, a user logon identifier, a digital signature, and/or a digital key. In one embodiment, the user credentials may be acquired from a remote server, such as server 160 in FIG. 1. In another embodiment, the user credentials may be stored locally on the computing device. In some cases, the user credentials may be acquired using a mapping table or a secure database (or secure data repository) associating end user identifications with user credentials (e.g., a password vault or other secure store of passwords).

One embodiment of a process for acquiring one or more user credentials is described later in reference to FIG. 3C.

In step 314, the user credentials are provided to the target application. In one embodiment, the user credentials may be inputted into fields of a particular webpage. In another embodiment, the user credentials may be inputted into fields of a particular security protected application. The user credentials may be automatically filled (or placed) into the corresponding fields. In some cases, the user credentials may be provided to the target application via an intelligent field filling application in which the corresponding fields are automatically filled-in with or without explicit end user acceptance. Once the corresponding fields have been filled with the user credentials, then the user credentials may be submitted to the target application. The user credentials may be submitted to the target application either automatically or after a submission action is performed by the end user of the computing device. The end user may have the option of accepting an auto-filled entry or modifying the auto-filled entry prior to submission of the user credentials to the target application. In cases where an end user has modified an auto-filled entry, the secure data repository storing the user credentials may be updated with the modified entry.

In some cases, the provision of user credentials to the target application may be dependent on authentication level. For example, certain target applications may require a higher authentication level, such as two or more levels of biometric identification, or that the mobile device be located in the user's home or office.

In step 316, protected data is received from the target application. The protected data, which may only be accessible to authenticated users, may be received from an external server. In one embodiment, the protected data may include personal banking information associated with the end user. In step 318, the protected data is displayed. The protected data may be displayed on a touchscreen display of a mobile computing device.

Figure 3B:
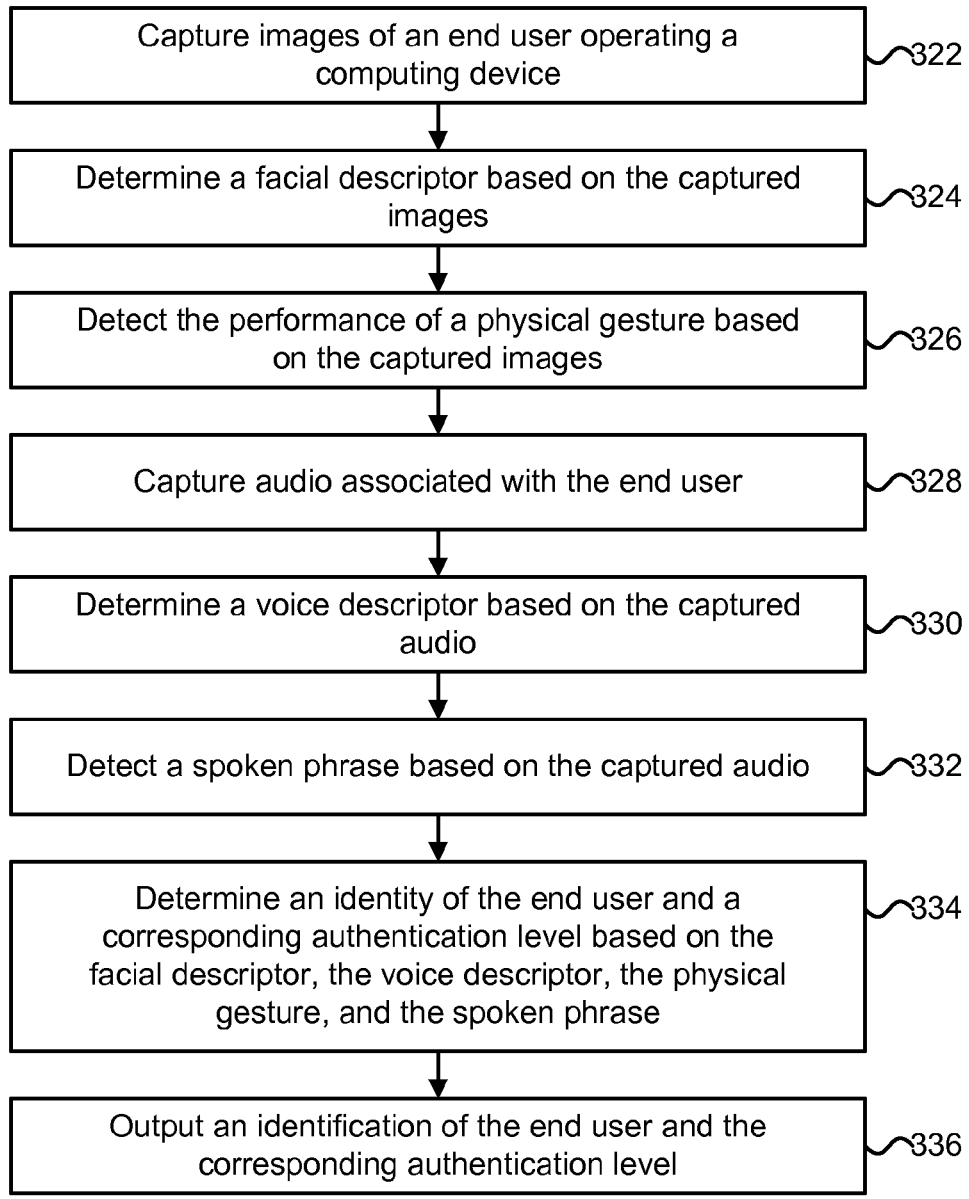
FIG. 3B is a flowchart describing one embodiment of a process for determining an identity of an end user.

FIG. 3B is a flowchart describing one embodiment of a process for determining an identity of an end user. The process described in FIG. 3B is one example of a process for implementing step 302 in FIG. 3A. In one embodiment, the process of FIG. 3B is performed by a mobile device, such as mobile device 140 in FIG. 1.

In step 322, images of an end user operating a computing device are captured. The images may be captured using a front-facing camera, such as front-facing camera 253 in FIG. 2A. In step 324, a facial descriptor is determined based on the captured images. The facial descriptor may comprise information regarding select facial features (e.g., the relative position of a person's eyes, nose, cheekbones, and/or jaw) that are used for identifying or verifying an end user of the computing device using facial recognition techniques. The select facial features may be extracted or detected within the captured images by applying various image processing techniques such as object recognition, feature detection, corner detection, blob detection, and edge detection methods to the captured images.

In step 326, the performance of a physical gesture is detected based on the captured images. The physical gesture may comprise a motion or pose performed by an end user of the computing device. The physical gesture may comprise a dynamic and/or static gesture. A dynamic gesture is one comprising a motion. A static gesture may include a static pose, such as the end user touching and holding their nose or forehead. The physical gesture may be detected by applying gesture recognition techniques to the captured images. In some cases, the physical gesture may comprise the end user pulling their ears, sticking out their tongue, brushing their hair, or biting their lip. The detection of a physical gesture being performed by the end user (e.g., during an unlock event) may be used in combination with facial recognition in order to improve the degree of confidence in identifying the end user.

In step 328, audio associated with the end user is captured. The audio may be captured using a microphone, such as microphone 255 in FIG. 2A. The audio associated with the end user may comprise a spoken phrase made by the end user. In step 330, a voice descriptor may be determined based on the captured audio. The voice descriptor may comprise information regarding select audio features that are used for identifying or verifying an end user of the computing device using voice recognition techniques.

In step 332, a spoken phrase is detected based on the captured audio. The spoken phrase may comprise a particular sequence of words. In one example, the spoken phrase may comprise a phrase such as "unlock my device" or "I am William." The detection of a spoken phrase (e.g., during an unlock event) in combination with voice recognition may be used to improve the degree of confidence in identifying the end user.

In step 334, an identity of the end user and a corresponding authentication level may be determined based on the facial descriptor, the voice descriptor, the physical gesture, and the spoken phrase. The identity of the end user may be associated with an alphanumeric user identifier. In one embodiment, the identity of the end user is determined based on matching the facial descriptor and the voice descriptor with descriptors corresponding with the end user. The authentication level may correspond with a degree of confidence in which the facial descriptor and/or voice descriptor have matched descriptors corresponding with the end user. In step 336, an identification of the end user and the corresponding authentication level are outputted.

Figure 3C:
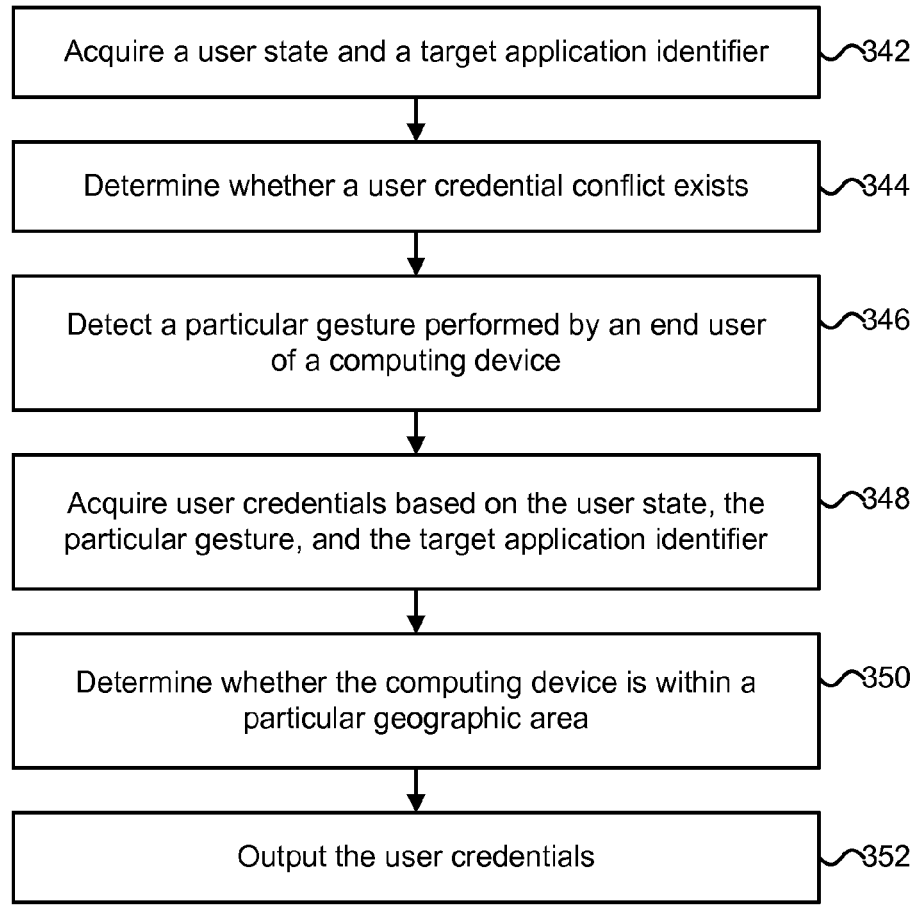
FIG. 3C is a flowchart describing one embodiment of a process for acquiring one or more user credentials.

FIG. 3C is a flowchart describing one embodiment of a process for acquiring one or more user credentials. The process described in FIG. 3C is one example of a process for implementing step 312 in FIG. 3A. In one embodiment, the process of FIG. 3C is performed by a mobile device, such as mobile device 140 in FIG. 1.

In step 342, a user state and a target application identifier are acquired. The user state may correspond with a current end user of the computing device (e.g., as determined by step 302 of FIG. 3A). In step 344, it is determined whether a user credential conflict exists. A user credential conflict may exist (or be detected) when more than one set of user credentials are associated with the user state and the target application identifier. For example, the same end user may have different user accounts corresponding with the same webpage (e.g., a webpage associated with an online banking account) or native application.

In step 346, a particular gesture performed by an end user of a computing device is detected. In one embodiment, the particular gesture may be performed by the end user using a touchscreen interface, such as touchscreen display 256 in FIG. 2A. The particular gesture may comprise the end user writing a particular letter or number or drawing a particular shape or symbol associated with a particular user account. In one embodiment, an end user may access a particular account of two or more different accounts (e.g., a first online banking account associated with a personal banking account and a second online banking account associated with a business banking account) through the same website or portal using the particular gesture. The first online banking account may correspond with the letter "P," while the second online banking account may correspond with the letter "B."

In step 348, user credentials based on the user state, the particular gesture, and the target application identifier are acquired. The user credentials may include a user password, a user logon identifier, a digital signature, and/or a digital key. In one embodiment, the user credentials may be acquired from a remote server. In another embodiment, the user credentials may be stored locally on the computing device. In some cases, the user credentials may be acquired using a mapping table or a secure database associating end user identifications with user credentials (e.g., a password vault or other secure store of passwords).

In step 350, it is determined whether the computing device is within a particular geographic area. The location of a computing device, such as a mobile computing device, may be determined using a GPS location associated with the computing device. If the computing device is within the particular geographic area (or areas), then the user credentials acquired in step 348 may be outputted. The particular geographic area may correspond with a home environment or a work environment of the end user. In cases where the computing device is outside of the particular geographic area (e.g., a mobile device has been stolen or is away from a protected environment), the release of the user credentials may require further verification of the end user. In step 352, the user credentials are outputted.

Figure 4:
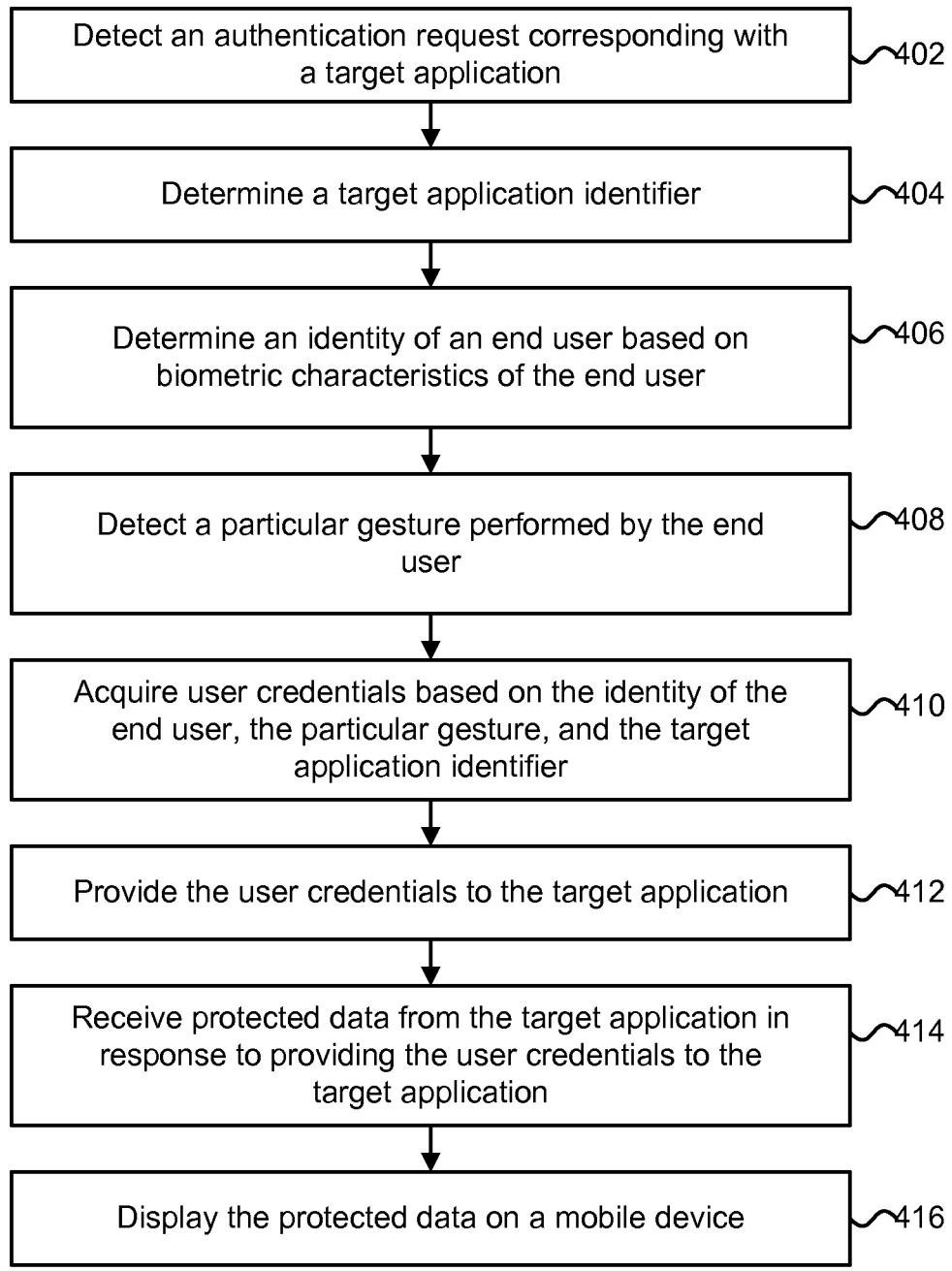
FIG. 4 is a flowchart describing an alternative embodiment of a process for automating the entry of user credentials into a computing application.

FIG. 4 is a flowchart describing an alternative embodiment of a process for automating the entry of user credentials into a computing application. In one embodiment, the process of FIG. 4 is performed by a mobile device, such as mobile device 140 in FIG. 1.

In step 402, an authentication request corresponding with a target application is detected. In one embodiment, the target application may comprise a native application. In another embodiment, the target application may comprise a web-based application. In one example, a web-based application may comprise a web browser-based application that is running within a web browsing application running on the computing device. In another example, a web-based application may comprise a client application that is downloaded from the Internet when the end user of the computing device interacts with an external server.

In some embodiments, an authentication request may be detected upon the triggering of a virtual keyboard by the end user of the computing device or upon a virtual keyboard application requesting user input into an application field. In other embodiments, in order for the authentication request to be detected, the end user must both trigger the display of a virtual keyboard on the computing device and perform a particular gesture over the virtual keyboard (e.g., writing their initials over the virtual keyboard). In some cases, the authentication request may be explicitly requested by the target application.

In step 404, a target application identifier is determined. The target application identifier may comprise an alphanumeric identifier associated with the target application. The target application identifier may correspond with an application currently being viewed or used by the end user of the computing device or an application at the top of an application stack. The target application identifier may correspond with a particular website or webpage. In one example, an end user of the computing device may select a password field associated with a particular website within a web browser (e.g., a password field associated with an online banking account). In this case, the target application identifier may correspond with the particular website or the particular webpage that is being interacted with by the end user.

In step 406, an identity of an end user is determined based on biometric characteristics of the end user. In one embodiment, the identity of the end user of the computing device and a corresponding authentication level may be determined by performing facial recognition techniques and/or voice recognition techniques. In some cases, the biometric characteristics may comprise distinguishing characteristics of the end user including one or more voice characteristics and/or one or more facial characteristics. The biometric characteristics may also comprise fingerprint characteristics (e.g., via a finger scan) or retinal characteristics (e.g., via a retinal scan of an eye of the end user).

The corresponding authentication level may be associated with a degree of confidence of the identity of the end user. In some cases, the corresponding authentication level may be updated over time as additional biometric characteristics of the end user are identified. In one embodiment, a first authentication level corresponding with a likelihood that the identity of the end user is in fact the correct identity may be determined based on a first set of biometric characteristics captured during a first time period. A second authentication level corresponding with a high probability that the identity of the end user is in fact the correct identity may be determined based on a second set of biometric characteristics different from the first set of biometric characteristics during a second time period. In one example, the authentication level may be associated with a high probability that the identity of the end user is in fact the correct identity if both a facial recognition match and a voice recognition match correspond with a particular identity of the end user. In another example, the authentication level may be associated with a high probability that the identity of the end user is in fact the correct identity if the biometric identification was obtained while the mobile device was in a known location, such as the end user's home or office.

In step 408, a particular gesture performed by the end user is detected. In one embodiment, the particular gesture may be performed by the end user using a touchscreen interface, such as touchscreen display 256 in FIG. 2A. The particular gesture may comprise the end user writing a particular letter or number or drawing a particular shape or symbol associated with a particular user account. In one embodiment, an end user may access a particular account of two or more different accounts (e.g., a first online banking account associated with a personal banking account and a second online banking account associated with a business banking account) through the same website or portal using the particular gesture. The first online banking account may correspond with the letter "P," while the second online banking account may correspond with the letter "B."

In step 410, user credentials are acquired based on the identity of the end user, the particular gesture, and the target application identifier. The user credentials may include a user password, a user logon identifier, a digital signature, and/or a digital key. In one embodiment, the user credentials may be acquired from a remote server. In another embodiment, the user credentials may be stored locally on the computing device. In some cases, the user credentials may be acquired using a mapping table or a secure database associating end user identifications with user credentials (e.g., a password vault or other secure store of passwords).

In step 412, the user credentials are provided to the target application. In one embodiment, the user credentials may be inputted into fields of a particular webpage. In another embodiment, the user credentials may be inputted into fields of a particular security protected application. The user credentials may be automatically filled (or placed) into the corresponding fields. In some cases, the user credentials may be provided to the target application via an intelligent field filling application in which the corresponding fields are automatically filled-in with or without explicit end user acceptance. Once the corresponding fields have been filled with the user credentials, then the user credentials may be submitted to the target application. The user credentials may be submitted to the target application either automatically or after a submission action is performed by the end user of the computing device. The end user may have the option of accepting an auto-filled entry or modifying the auto-filled entry prior to submission of the user credentials to the target application. In cases where an end user has modified an auto-filled entry, the mapping table or secure database storing the user credentials may be updated with the modified entry.

In step 414, protected data is received from the target application in response to providing the user credentials to the target application. The protected data, which may only be accessible to authenticated users, may be received from an external server. In one embodiment, the protected data may include personal banking information associated with the end user. In step 416, the protected data is displayed on a mobile device, such as mobile device 140 in FIG. 1. The protected data may be displayed on a touchscreen display of the mobile device.

Figure 5:
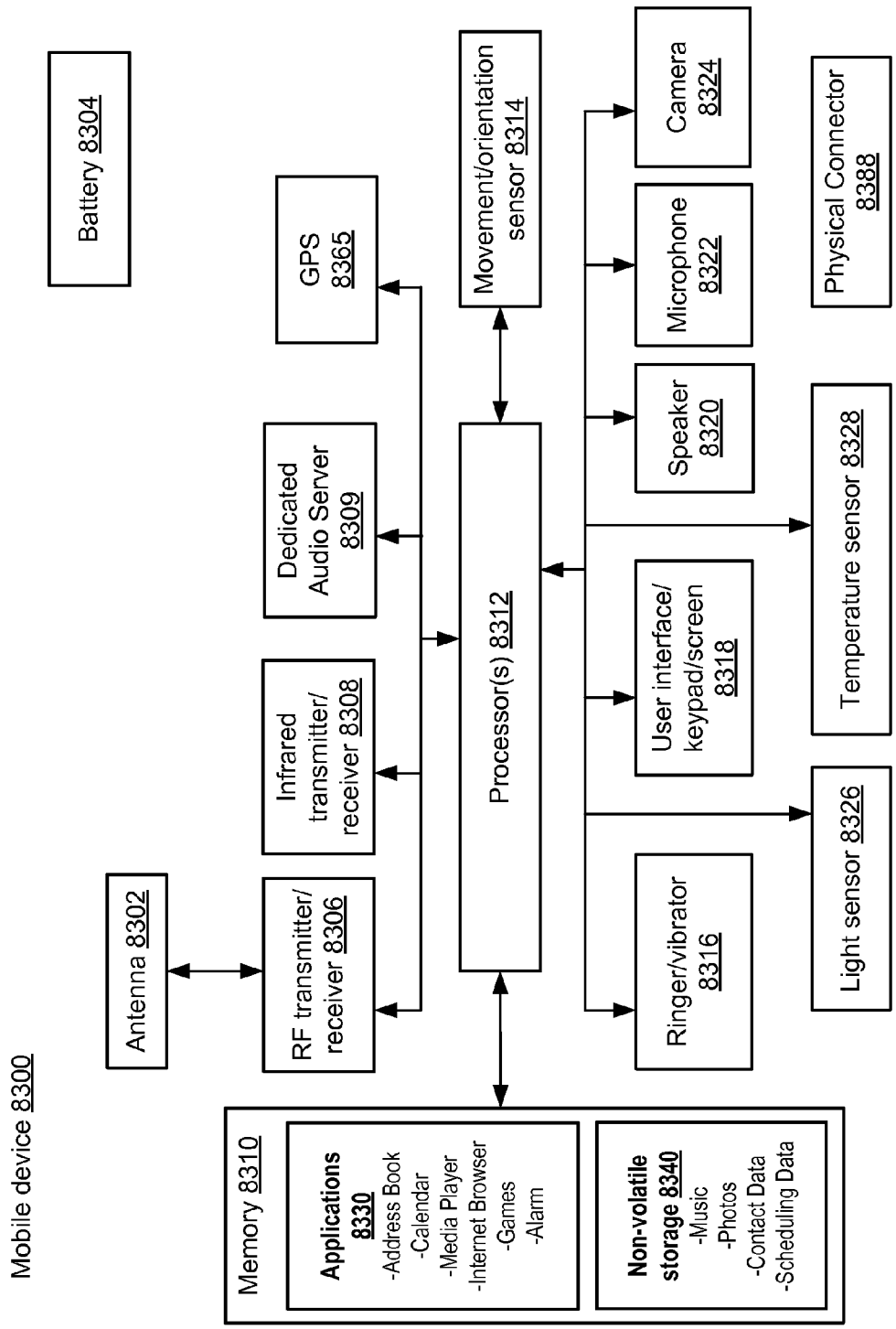
FIG. 5 depicts one embodiment of a mobile device.

The disclosed technology may be used with various computing systems. FIG. 5 depicts one embodiment of a mobile device 8300, which includes one example of a mobile implementation for mobile device 140 in FIG. 1. Mobile devices may include laptop computers, pocket computers, mobile phones, personal digital assistants, tablet computers, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with dedicated audio server 8309, with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. For example, the data connection may allow for operations such as synchronizing mobile device data with the computing data on another device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for automating entry of a user credential into a computing application running on a computing device, comprising:
    determining an identity of an end user of the computing device using biometric identification;
    detecting an authentication request corresponding with the computing application;
    determining a target application identifier associated with the computing application;
    detecting a user credential conflict associated with the identity of the end user and the target application identifier;
    detecting a particular gesture performed by the end user in response to the detecting a user credential conflict;
    acquiring the user credential based on the identity of the end user and the target application identifier, the acquiring the user credential comprises acquiring the user credential based on the identity of the end user, the particular gesture, and the target application identifier; and
    providing the user credential to the computing application.

2. The method of claim 1, further comprising:
    determining a location of the computing device, the acquiring the user credential comprises acquiring the user credential based on the location of the computing device.

3. The method of claim 2, wherein:
    the particular gesture comprises the end user drawing a particular symbol on a touchscreen interface of the computing device.

4. The method of claim 1, wherein:
    the determining an identity of an end user of the computing device using biometric identification comprises identifying the end user using at least one of facial recognition, voice recognition, fingerprint recognition, or retina recognition.

5. The method of claim 1, wherein:
    the determining an identity of an end user of the computing device using biometric identification comprises capturing images of the end user and performing facial recognition techniques on the images.

6. The method of claim 1, wherein:
    the determining an identity of an end user of the computing device using biometric identification comprises capturing images of the end user and performing facial recognition techniques on the images; and
    the detecting a particular gesture performed by the end user comprises performing gesture recognition techniques on the images and detecting the particular gesture performed by the end user based on the performing gesture recognition techniques on the images.

7. The method of claim 1, wherein:
    the determining an identity of an end user of the computing device using biometric identification comprises capturing audio of the end user and performing voice recognition techniques on the audio.

8. The method of claim 1, wherein:
the user credential comprises a user password.

9. The method of claim 1, further comprising:
detecting an unlock condition associated with the computing device, the determining an identity of an end user is performed in response to the detecting an unlock condition.

10. The method of claim 1, further comprising:
determining an authentication level corresponding with the identity of the end user, the determining an authentication level includes determining a number of different biometric identifiers used for identifying the end user during biometric identification and determining a location of the computing device; and
the acquiring the user credential comprises acquiring the user credential based on the identity of the end user, the authentication level, and the target application identifier.

11. The method of claim 1, further comprising:
receiving protected data from the target application; and
displaying the protected data on the computing device, the computing device comprises a mobile computing device.

12. A system, comprising:
a storage device, the storage device stores a user state; and
a processor in communication with the storage device, the processor detects an unlock condition associated with the system and determines an identity of an end user of the system using biometric identification in response to the unlock condition being detected, the processor sets the user state based on the identity of the end user and detects an authentication request corresponding with a computing application running on the system, the processor determines a target application identifier associated with the computing application and acquires a user credential based on the user state and the target application identifier, the processor detects a user credential conflict associated with the user state and the target application identifier, the processor detects a particular gesture performed by the end user, the processor acquires the user credential based on the particular gesture and the target application identifier, the processor provides the user credential to the computing application.

13. The system of claim 12, wherein:
the system comprises a mobile computing device, the processor determines a location of the mobile computing device, the processor acquires the user credential based on the location of the mobile computing device.

14. The system of claim 13, wherein:
the particular gesture comprises the end user drawing a particular symbol on a touchscreen interface of the system.

15. The system of claim 12, wherein:
the biometric identification comprises identifying the end user using at least one of facial recognition, voice recognition, fingerprint recognition, or retina recognition.

16. The system of claim 12, wherein:
the user credential comprises a user password.

17. A computer program product, comprising:
a computer readable storage medium having computer readable program code embodied therewith, the computer readable program code comprising:
computer readable program code configured to detect an authentication request corresponding with a target application running on a computing device;
computer readable program code configured to determine a target application identifier associated with the target application;
computer readable program code configured to determine an identity of an end user of the computing device based on biometric characteristics of the end user;
computer readable program code configured to detect a user credential conflict associated with the identity of the end user and the target application identifier;
computer readable program code configured to detect a particular gesture performed by the end user in response to the user credential conflict being detected;
computer readable program code configured to acquire the user credential based on the identity of the end user, the particular gesture, and the target application identifier; and
computer readable program code configured to provide the user credential to the target application.

18. The computer program product of claim 17, wherein the computer readable program code further comprises:
computer readable program code configured to determine a location of the computing device, the user credential is acquired based on the location of the computing device.

19. The computer program product of claim 18, wherein:
the particular gesture comprises the end user drawing a particular symbol on a touchscreen interface of the computing device.

20. The computer program product of claim 19, wherein:
the biometric characteristics of the end user comprise at least one of facial characteristics, voice characteristics, fingerprint characteristics, or retina characteristics of the end user.

* * * * *